(No Model.)

M. C. ATKINSON.
MILK SKIMMER.

No. 333,098.      Patented Dec. 29, 1885.

WITNESSES:
A. C. Eader
John E. Morris.

INVENTOR:
Mary C. Atkinson

By Chas B. Mann
Attorney.

UNITED STATES PATENT OFFICE.

MARY C. ATKINSON, OF BALTIMORE, MARYLAND.

MILK-SKIMMER.

SPECIFICATION forming part of Letters Patent No. 333,098, dated December 29, 1885.

Application filed May 28, 1884. Serial No. 133,011. (No model.)

*To all whom it may concern:*

Be it known that I, MARY C. ATKINSON, a citizen of the United States, residing at Baltimore, in the State of Maryland, have invented certain new and useful Improvements in Milk-Skimmers, of which the following is a specification.

My invention relates to an improved milk-skimmer whereby all the cream on the surface of milk may be lifted therefrom bodily.

The construction of the improved skimmer whereby the desired result is accomplished will be described in connection with the accompanying drawings, which illustrate what is deemed the best means of carrying the invention into effect.

Figure 1:
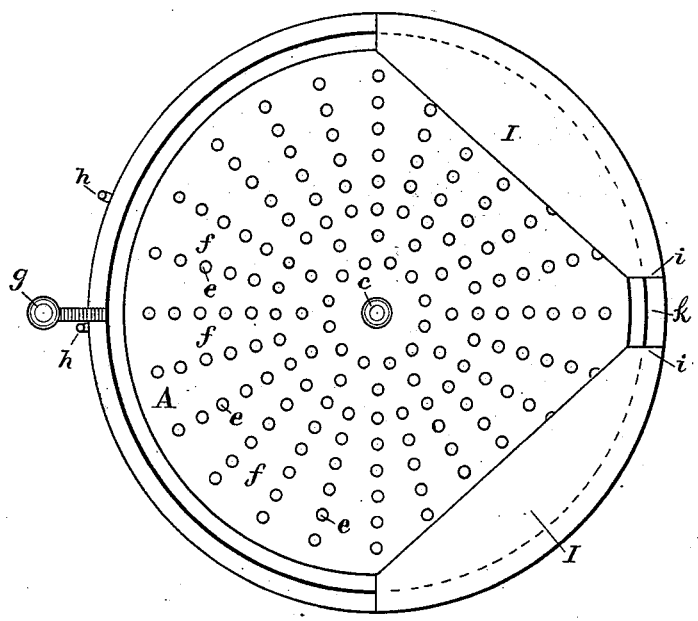
Figure 2:
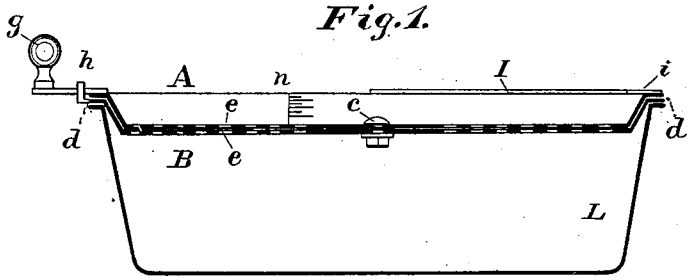
Figure 3:
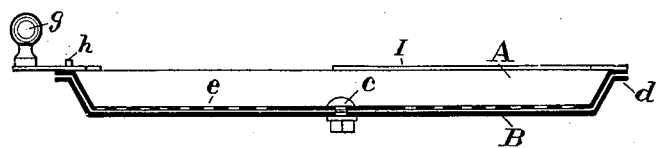

In the accompanying drawings, Figure 1 is a top view of the skimmer. Fig. 2 is a diametrical section of the skimmer, taken on a line extending horizontally across Fig. 1, showing the position it occupies on a milk-pan when the milk is set for the cream to rise. Fig. 3 is also a diametrical section on the same plane as that of Fig. 2, showing the skimmer as it is when the cream is being lifted from the surface of the milk.

The skimmer consists of two circular plates, A B, one fitting in close contact with the other, and the two secured together at the center by a pivot-bolt, c. Both plates have an upturned rim, and each may have, but it is important that at least the lower one has, a horizontal flange, d, which is designed by resting on the rim of the milk-pan to support the skimmer. Each circular plate has perforations e, which are formed in the flat surface within the rim. These perforations are so located that when the two plates are turned on their pivot and have a certain position with respect to each other the perforations of one plate will coincide with those in the other, as seen in Fig. 2, and when the plates are turned to a different position the said perforations will not coincide, but, on the contrary, the spaces f between the perforations of one plate will close or cover the perforations of the other plate, as seen in Fig. 3. The upper plate has on its rim a handle, g, and the lower plate two stops, h, spaced apart as far as it is designed the plates shall move or turn. The handle has position and is movable between the stops; thereby the stops limit the movement of the plates.

To confine the cream when pouring it, so as to insure its delivery at a given point on the rim, as if poured from a spout, two guard-plates, I, are attached on opposite sides of the rim. In the present instance each plate extends about one-fourth the way around the rim. The length, however, of these plates may vary, being a matter of judgment. One end, i, of one guard-plate has position near one end, i, of the other; but a space or opening, k, separates said ends. This opening between the ends of the guard-plates serves as a spout.

The foregoing described parts comprise the improved skimmer, which is adapted to set on the rim of any ordinary milk-pan, L.

In operation the skimmer is set on the rim of the empty milk-pan. The two plates are turned, as seen in Fig. 2—that is, with the perforations above and below coinciding. The pan is filled by pouring the milk through the skimmer. The milk should have the same depth in the skimmer as the cream will occupy when it shall have risen to the surface. The scale-marks n in the upper plate will serve as a guide for the depth. After the milk has been standing the usual time it will be found that the cream has risen through the perforations and has collected above the plates A B. When it is desired to skim or remove the cream, the upper plate is partly turned by grasping the handle g and moving it against the other stop. This closes the perforations. The skimmer containing the cream may now be lifted bodily from the milk-pan and tilted to deliver or turn the cream out through the spout-opening k into any receptacle.

Having described my invention, I claim and desire to secure by Letters Patent of the United States—

1. A milk-skimmer consisting of two circular plates, each having an upturned rim, the lower one of which is provided with a horizontal flange, and both plates having the flat surface within the rim perforated, and one plate fitting closely within the other, and the two pivoted together at the center to admit of partly turning, and means to limit the extent of the turning movement, as set forth.

2. A milk-skimmer having a perforated plate with a rim, and provided with a spout composed of two guard-plates attached to the rim in such position as to leave a space or opening between the adjacent ends of the plates, as set forth.

In testimony whereof I affix my signature in presence of two witnesses.

MARY C. ATKINSON.

Witnesses:
　ARCB. ATKINSON,
　JOHN R. LARUS.